United States Patent [19]
LaVallee

[11] 3,800,948
[45] Apr. 2, 1974

[54] DUAL HYDRAULIC FILTER ARRANGEMENT

[75] Inventor: Raymond F. LaVallee, West Allis, Wis.

[73] Assignee: Allis-Chalmers Corporation, Milwaukee, Wis.

[22] Filed: July 26, 1973

[21] Appl. No.: 382,908

Related U.S. Application Data

[63] Continuation-in-part of Ser. No. 191,718, Oct. 22, 1971, abandoned.

[52] U.S. Cl. ............................... 210/136, 210/234
[51] Int. Cl. ............................................ B01d 27/08
[58] Field of Search .......... 210/136, 329, 340, 341, 210/234, 235

[56] References Cited

UNITED STATES PATENTS

| 2,471,951 | 5/1949 | Granbey | 210/341 |
| 3,363,762 | 1/1968 | Ensign | 210/136 |
| 3,190,445 | 6/1965 | Rosaen | 210/340 X |

Primary Examiner—Samih N. Zaharna
Assistant Examiner—T. A. Granger
Attorney, Agent, or Firm—Arthur L. Nelson

[57] ABSTRACT

A dual filter arrangement in a hydraulic system having means for selectively replacing the filter element while the system is in operation.

10 Claims, 3 Drawing Figures

DUAL HYDRAULIC FILTER ARRANGEMENT

This invention relates to a filter and more particularly to a dual filter arrangement in a hydraulic system having means for selectively and alternatively replacing a filter cartridge while the hydraulic system is in operation. This is a continuation-in-part application of application Ser. No. 191,718, filed Oct. 22, 1971 now abandoned.

In conventional hydraulic systems such as lubricating oil systems for engines, a disposable cartridge of inexpensive material such as porous paper, fibrous material and the like is used in the hydraulic system to filter the hydraulic fluid when the system is in operation. It is conventional practice to replace the filter cartridge only when the hydraulic fluid is also replaced. In some instances the filter cartridge may require replacement less frequently than the oil change; however, it may also be advisable to replace the filter cartridge more often than the oil change. Under these circumstances, it is desirable to isolate the fluid in the hydraulic system from the fluid which is in the filter chamber. It may also be desirable to replace the filter cartridge without interrupting the flow of fluid in the hydraulic system or interrupting the operation of the pump which pumps the fluid through the system. Conventional systems do not permit replacement of the filter without drainage of the oil or hydraulic fluid in the system. This is particularly true where the filter cartridge is in a low position of the hydraulic system; for instance, between the sump and the pump. Hydraulic systems for operating hydraulic lifts and providing other hydraulic operations on vehicles today require a substantial volume of fluid which may be in the neighborhood of thirty gallons.

The hydraulic fluid in these systems does not deteriorate or wear out, but does become contaminated, and accordingly, a good filtering arrangement to maintain the fluid in the clean operating condition is imperative. This invention provides a dual filter arrangement which automatically cuts off each filter chamber from the hydraulic system to permit selective and alternative replacement of one of the dual filters while the other filter remains in operation in the hydraulic system.

It is an object of this invention to provide a dual filter in a hydraulic system having means for selectively and alternatively replacing each cartridge without shutdown of the system.

It is another object of this invention to provide a dual filter in a hydraulic system having a valve associated with the filter cartridge to automatically close the filter chamber from the hydraulic system to permit each filter cartridge to be selectively replaced without shutting down operation in the hydraulic system.

It is a further object of this invention to provide a dual filter arrangement in a hydraulic system having a valve operated by the filter cartridge which opens in response to positioning a filter in a filter chamber and closes in response to removal of the filter from the filter chamber to permit selective and alternative replacement of each cartridge in the hydraulic system without shutting down operation of the hydraulic system.

The objects of this invention are provided by the use of dual filters in parallel in the hydraulic system. The filters are preferably positioned between the sump and the pump whereby removal of one filter shunts the hydraulic fluid through the other filter for temporary operation while the first filter is being removed. As the first filter is replaced, the second filter may then be removed while the hydraulic fluid shunts through the first filter. Accordingly, both filters can be replaced while the hydraulic system is in operation. The filters can be big enough to provide operation of the hydraulic system under load conditions if desirable, or smaller filters may be used which are adequate to provide filtering in the hydraulic system under low load conditions with a single filter. The size of the filter is merely a designer's choice to accomplish the purpose for which the hydraulic system is intended to operate.

Referring to the drawings, the preferred embodiment in this device is illustrated.

Figure 1:
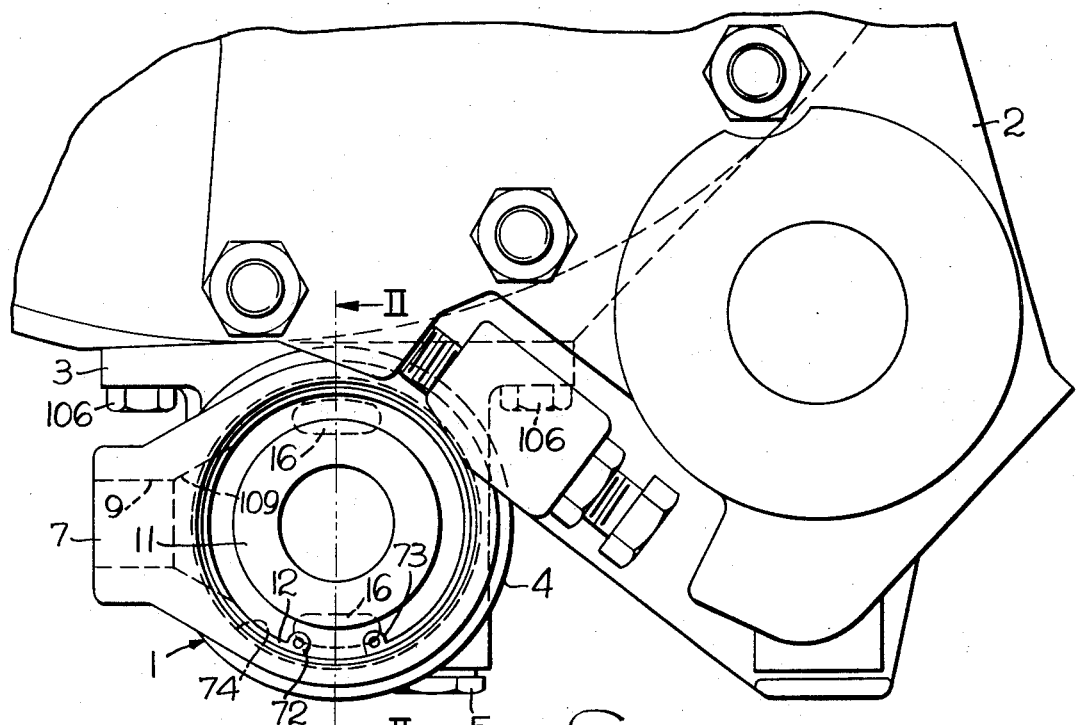
FIG. 1 illustrates a side elevation view of the filter assembly.
Figure 2:
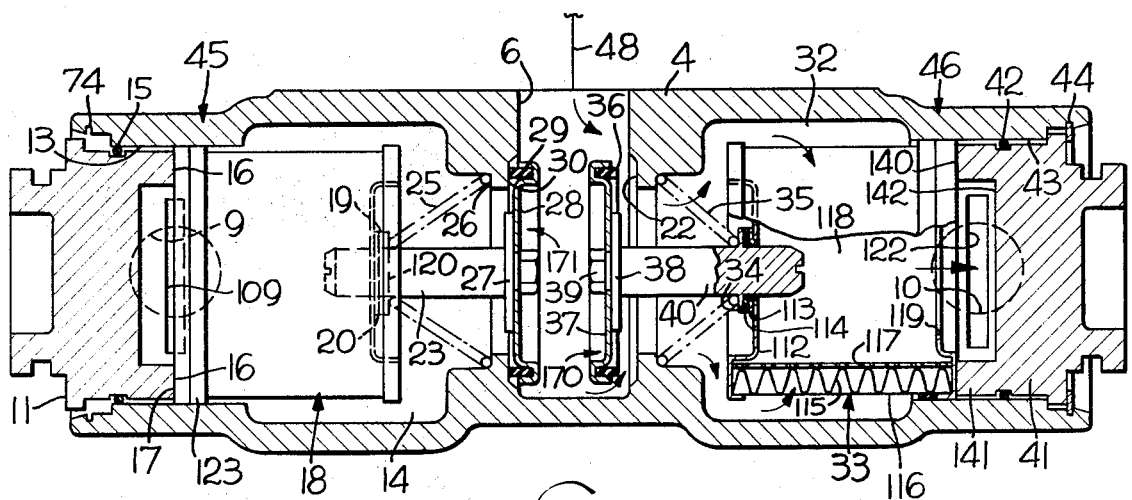
FIG. 2 is a cross section view taken on line II—II of FIG. 1.

Referring to the drawings, FIG. 1 illustrates the filter assembly 1 mounted in the rear end housing 2 of the vehicle chassis. The bracket 3 supports the cylinder 4 which extends transversely across the rear end on the underside of the vehicle. Drain plug 5 permits draining the inlet passage 6 in the filter assembly. The bracket 3 is supported by a plurality of bolts 106 which fasten on the underside of the rear end housing. Conduit 7 illustrates one of the outlet conduits connected to the filter assembly which forms the passage 9 as illustrated in FIG. 2. Similarly, a second output passage 10 is formed on the opposite end of the cylinder 1. The passages 9 and 10 form peripheral slots 109 and 122 on their radially inner ends. A cover plate 11 is retained in position by the snap ring 12, as shown in FIG. 1. The cover plate 11 is received within the cylindrical opening 13 of the chamber 14. The seal 15 is positioned intermediate the cylindrical opening 13 and the cover 11 which seals the opening when the filter cartridge is closed in the chamber, similiar to the position of the filter as shown in the right hand side of FIG. 2. The cover 11 forms the radial facings 16 on each of two protuberances which engages end cap 17 of cartridge 18 which carries a seal 123. A seal 19 engages the radial facings of the plate 20 and annulus 120 on valve actuator 23 to seal the inner end of the cartridge 18. The annulus 120 is biased to the position as shown by the spring 25. Spring 25 is positioned on the spring seat 26. The valve actuator 23 is connected through a washer 27 to retainer 28 which carries a valve element 29 which engages the valve seat 30 when the valve is closed. The valve is normally closed when the cartridge is removed from the chamber 14.

The cartridge chamber 32 receives a cartridge 33. The annulus 34 biases the spring 35 to a compressed position. Plate 113 on end cap 112 of cartridge 33 holds seal 114 against the force of spring 35 on annulus 34. Washer 38 and retainer 37 are compressively fastened by the cap screw 39 on the valve actuator 40. Actuator 40 unseats the valve element 36 from the valve seat 22 when the cartridge is in the operating position.

The valve cover 41 carries a seal 42 which seals the opening 43 in the end of the cylinder 1. The protuberances 140 and 141 on the cover 41 engage the cartridge 33 on its upper and lower edge as shown in FIG. 2. This permits the return flow of fluid from the filter 33 radially through the recess 142, slot 122 and passage 10. The snap ring 44 retains the valve cover 41 in its closed position against the biasing force of spring 35.

Figure 3:
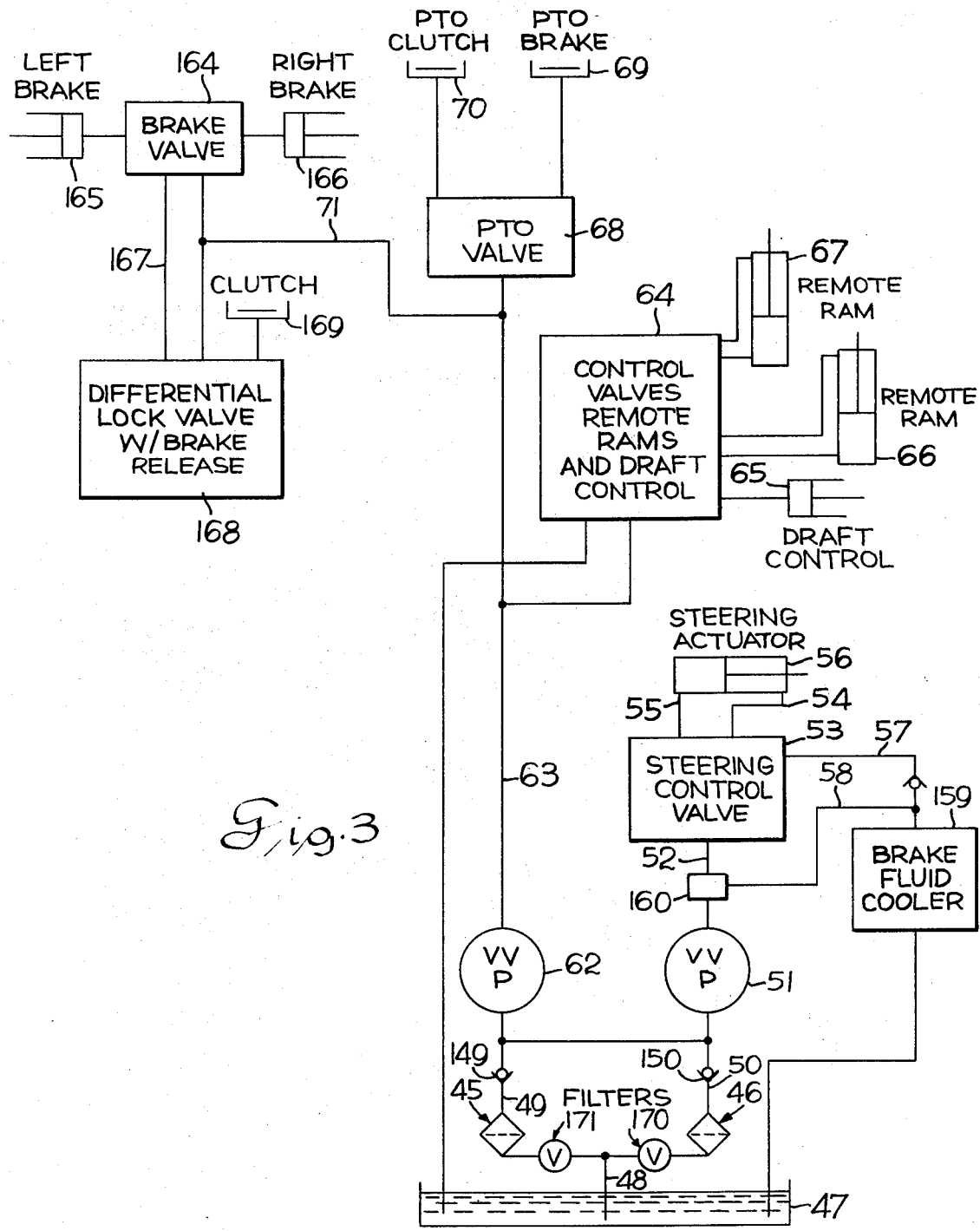
FIG. 3 is a schematic illustration of the hydraulic system employing the dual filter arrangement.

Referring to FIG. 3, the filters 45 and 46 are shown in the hydraulic system. The sump 47 supplies low pressure hydraulic fluid to the filters 45 and 46 through the conduit 48. Conduit 48 is connected to passage 6 on the inlet side of the filters 45 and 46. The outlet passages 9 and 10 are connected to conduits 49 and 50 respectively. Conduit 49 contains check valve 149 and conduit 50 contains check valve 150. For the purpose of illustration, two hydraulic circuits are shown, although a single hydraulic circuit may be used. The hydraulic system shows the use of dual filters and permits continuous operation of the system during replacement of the filters.

The pump 51 pressurizes hydraulic fluid in the conduit 52 for operating the steering control valve 53. The steering control valve controls the supply of pressurized fluid through the conduits 54 and 55 to operate the steering cylinder 56. The bypass conduit 57 and low priority conduit 58 supply hydraulic fluid to the brake fluid cooler 159 in response to priority flow control valve 160.

A second pump 62 pressurizes hydraulic fluid in conduit 63 which is supplied to the hydraulic draft control valve 64. The control valve supplies fluid to the draft control ram 65 and remote rams 66 and 67, as required by the control valve 64.

Power take-off valve 68 controls the flow of pressurized fluid to the power take-off brake 69 and the power take-off clutch 70 in response to operation of power take-off control valve. Similarly, a conduit 71 is connected to conduit 63 to supply pressurized fluid to the brake valve 164 for operating the brake cylinders 165 and 166. A conduit 167 from the brake valve in turn operates the differential lock valve 168 to operate the clutch 169 in the differential in the rear end of the vehicle. To accomplish the functions as illustrated in the system shown in FIG. 3 requires a substantial amount of hydraulic fluid which may be in the neighborhood of thirty gallons. Accordingly, it is desirable to filter the fluid and keep the fluid clean for optimum operation of the hydraulic system. Replacement of fluid is seldom necessary, providing the filter cartridges are changed periodically.

The operation of this device will be described in the following paragraphs.

The pumps 51 and 62 pressurize fluid which is drawn through the filters 45 and 46. The filters receive their fluid from the sump 47, as shown in FIG. 3. The filters 45 and 46 are connected in parallel whereby the fluid drawn through conduit 48 and passage 6 may pass through either filter 45 and 46. When one of the filter cartridges is removed, the flow of pressurized fluid passes through the other filter and then divides to flow through either of the two pumps.

The detailed construction is shown in FIG. 2, in which the inlet passage 6 is connected to the conduit 48. The flow is divided in the passage 6 and diverts to either filter chamber 32 or 14. Normally both of the valves 170 and 171 are open and the hydraulic fluid divides to flow through either cartridge 33 or 18. Referring to the right hand side of the illustration in FIG. 2, the fluid flows through the passage 6 and then into the chamber 32 through the open valve 170. The fluid then flows through the screen 116, the filtering medium 115 and the perforations 117 of the cartridge 33. The fluid then flows into the chamber 118 formed by the cartridge 33 and passes through the end opening 119 in the filter cartridge into the slot 122 and out of the passage 10 through conduit 50 to the pump 51. The fluid may pass from conduit 50 to conduit 49 since the conduits are connected through a connecting conduit. The same type of operation is provided for filtering the fluid through cartridge 18 as described above. The cartridge 18 is not shown in cross-section; however, it is the same type of filter cartridge as 33.

It is understood that the filter may be connected to a single source of pressurized fluid or may supply two circuits, as shown in FIG. 3. When it is required to replace the filter element, the snap ring 12 is removed by drawing the tabs 72 and 73 together to remove it from the annular groove 74, thereby permitting the cover 11 to be removed from the opening 13. With removal of the cover 11, the cartridge 18 is pressed outwardly in response to the biasing force of the spring 25. This in turn simultaneously seats the valve element 29 on the valve seat 30 to close the valve 171 isolating the filter chamber 14 from the hydraulic system. The cover 11 is then completely removed from the opening 13, and the cartridge 18 is removed and another cartridge is placed in the chamber 14. Once the cartridge 18 is replaced, the cover 11 is then compressed against the biasing force of the spring 25 and the snap ring 12 is seated in the annular groove 74 and the replacement of the cartridge is complete.

Similarly, the cartridge 33 may be replaced when it is so desired. It is understood that the valves 170 and 171 automatically close and isolate the respective filter chamber from the hydraulic system when the cartridge is removed. This in turn permits the use of the hydraulic system even though one of the cartridges is removed. It is understood that only one cartridge is removed at a time to allow continued operation of the hydraulic system.

The embodiments of the invention in which an exclusive property or privilege is claimed are defined as follows:

1. A dual filter arrangement for use in a hydraulic system comprising, a filter housing means defining an inlet passage means and an outlet passage means, said filter housing means defining a plurality of filter chambers in parallel relationship between the inlet and outlet passage means with each chamber connected to said inlet passage means and connected to said outlet passage means, valve means in the inlet passage means with a valve adjacent and controlling flow to each of said chambers including a valve element and a valve seat, actuating means connected to each said valve element and extending into the adjacent of said filter chambers, means normally biasing each said valve element to a closed position with its valve seat closing the inlet passage means to the respective filter chamber, said filter housing means defining an end opening for each of said chambers for receiving a filter cartridge, a filter cartridge received in a chamber of each of said filter chambers, a removable cover means having fastening means received in the end opening of each of said filter chambers with each one cover means closing one chamber, each cover means defining a recessed end portion providing passage means between said filter and said outlet passage means, each said cover means biasing each said filter for engaging said valve actuating means to thereby open each adjacent valve to permit fluid passage through said filter cartridge in said filter chamber and out said outlet when each cover means is located in the end opening of its filter chamber.

2. A dual filter arrangement for use in a hydraulic system as set forth in claim 1 wherein each of said valves includes a spring supporting said valve element normally biasing said valve to a closed position.

3. A dual filter arrangement for use in a hydraulic system as set forth in claim 1 wherein said filter housing includes a cylindrical construction defining two filter chambers coaxially aligned with each other.

4. A dual filter arrangement for use in a hydraulic system as set forth in claim 1 wherein said housing means defining said inlet passage means defines a chamber to permit outward movement of said valve element into said inlet passage means when said valve is open.

5. A dual filter arrangement for use in a hydraulic system as set forth in claim 1 wherein said inlet passage means includes a connecting passage means for connection to a first and a second filter chamber, conduit means connecting the outlet passages of said first and seond filter chambers.

6. A dual filter arrangement for use in a hydraulic system as set forth in claim 1 wherein said actuating means includes a filter cartridge seat, means on said cover means engaging said filter cartridge to thereby compressively position said filter cartridge between said cover means and said actuating means and open said valve when said cover is closed.

7. A dual filter arrangement for use in a hydraulic system as set forth in claim 1 including a bracket integral with and supporting said filter housing means.

8. A dual filter arrangement for use in a hydraulic system as set forth in claim 1 wherein said inlet passage means includes means adapted for connection to a sump, said outlet passage means includes means adapted for connection to a pump in said hydraulic system for drawing fluid through said filter chambers.

9. A dual filter arrangement for use in a hydraulic system as set forth in claim 1 wherein said filter housing defines a cylindrical filter chamber, means mounting each of said valves coaxially with said chamber in said filter chambers including a spring supporting and normally biasing said valve element to a closed position, a valve seat defined by said filter housing for engaging said valve element, a filter cartridge seat on said actuating means, said filter cartridge thereby biasing said valve to an open position when said cover means is closed.

10. A dual filter arrangement for use in a hydraulic system as set forth in claim 1 wherein said filter cartridge defines a cylindrical element, each of said cover means includes a peripheral seal for sealing said cover means with said filter housing, said cover means defining a central recess with a radial opening in said cover means connected to said outlet passage means to thereby provide fluid flow through said cover means to said outlet passage means.

* * * * *